Figure 1:
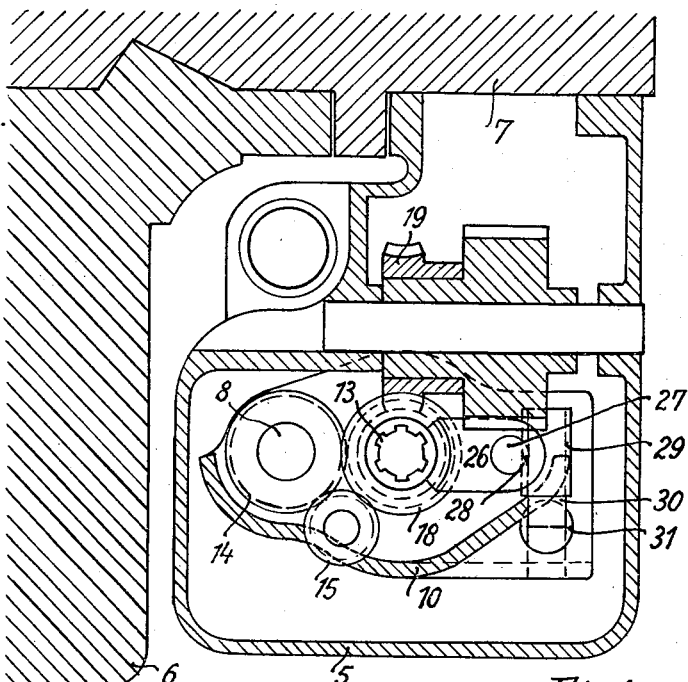

Sept. 29, 1942.  J. ROLOFF ET AL  2,297,501

FEED INTERRUPTION DEVICE FOR SLIDES

Filed May 24, 1940

Inventors
JOHANNES ROLOFF &
HANS HAUTSCH,
By
Bean, Brooks, Buckley & Bean.
Attorneys Patented Sept. 29, 1942

2,297,501

UNITED STATES PATENT OFFICE 2,297,501

FEED INTERRUPTION DEVICE FOR SLIDES

Johannes Roloff, Altenburg, Thuringia, and Hans Hautsch, Meuselwitz, Thuringia, Germany; vested in the Alien Property Custodian Application May 24, 1940, Serial No. 337,032
In Germany May 26, 1939

5 Claims. (Cl. 82—21)

This invention refers to an automatic longitudinal and cross feed interruption device for machine tool slides. With machine tools, e. g. centre lathes, it is common knowledge that the longitudinal or cross feed respectively may be interrupted automatically by adjustable stops. The feed is usually transmitted from the shaft drive of the machine to an intermediate shaft located in the gear casing, and thence by means of worm and worm wheel to the slide. It has been proposed with this type of arrangement, to locate the intermediate shaft in a casing or fixture that may swivel about the driving shaft, and to provide means whereby the intermediate shaft and the worm bearing thereon is disengaged from the worm wheel when the stops have been reached, so that despite running of the shaft drive the slide traverse is stopped.

When using, however, this disengaging worm arrangement several disadvantages are experienced. So, it has been found necessary, with one structure, to complete the traverse by hand until the stop is reached. With another type of arrangement for releasing the bolt holding the gear casing in its working position an extensive and complicated system of levers is necessary. A third form of construction makes use of a sliding clutch for interrupting the traverse, but here the disadvantage is, that owing to the powerful spring required to hold the coupling together a receding of the slide takes place after contacting with the stop and after the release has been effected.

The present invention concerns an arrangement for automatically releasing the slide feed by means of a disengaging worm which does not possess these disadvantages, but which through its simple and distinctive construction operates reliably and accurately.

Particularly, the invention has for its object a disengaging worm, which is slidable but non-rotatable on the intermediate shaft fitted in the drop-casing within the gear box, the worm being arranged between two spiral springs on the said shaft, and the worm meshing with a slide-operating worm-wheel from which it unscrews itself against one of the springs when the slide contacts with a fixed stop, its axial movement being transmitted by a connecting mechanism for disengaging the drop-casing locking pin.

It will be seen that the low tooth angle, e. g. 5°, of the worm, which governs the axial pressure on the spring and, therefore, determines its dimensions, enables in contrast to the couplings with a steep angle, usually 45°, weak springs to be used thereby keeping any mechanical tension to a minimum during releasing, so that at the moment of cutting out only a minimum reaction takes place, and the slide does not spring back to any detrimental extent.

Figure 2:
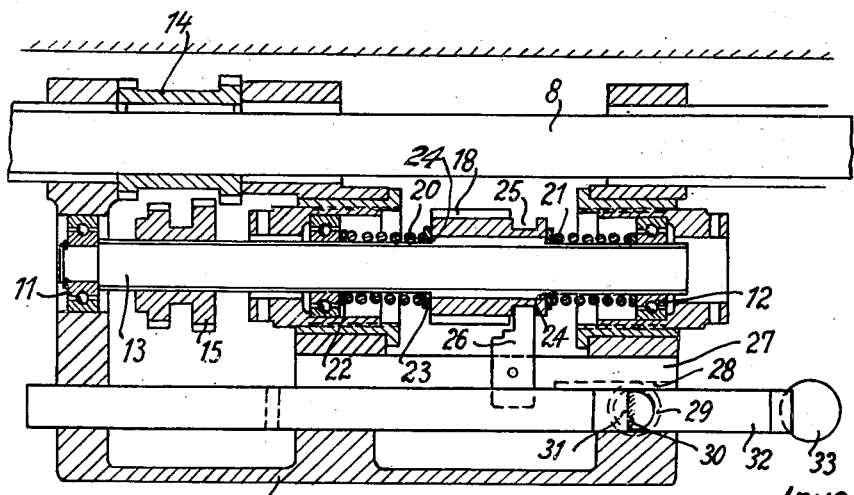

In order that the invention may be more clearly understood a constructive example is given in the accompanying drawing, wherein Fig. 1 is a cross section through the control box (unimportant parts having been omitted), whilst Fig. 2 shows a longitudinal section through the drop-casing.

The lead screw casing of a lathe is marked 5, the lathe bed 6, tool slide 7, and the shaft drive 8.

Around this driving shaft may swivel the drop-casing 10, in which the hardened and ground intermediate shaft 13 is mounted on ball bearings 11, 12. This shaft 13 effects the forward and reverse feed in the known manner over gear-wheel aggregate 14, 15 to worm 18 and worm-wheel 19, and further over suitable gearing, transmits it to lathe saddle 7.

From Fig. 2 it may be seen that the worm 18 is fitted between two spiral springs 20, 21 on profile shaft 13; the latter is preferably provided with milled splines so that the worm can slide on it, but can turn only together with said shaft. The springs are mounted between stops or end-plates 22, 23 so that they may be compressed, but cannot expand beyond a definite distance. This latter is attained, for example, with the stops 24 formed on shaft 13, against which the spring end-plates or caps bear.

In groove 25 of worm 18 fork 26 engages, the fork being rigidly fixed to bolt 27 having at 28 a toothed rack meshing with slide bolt 29, also toothed. The lower end 30 of this bolt has a flat bearing against flat 31 on locking bolt 32, holding the drop-casing 10 in its working position against counter bearing 33.

The method of working of the described arrangement is as follows. When the machine tool slide 7, during its longitudinal or transverse motion runs against a fixed stop on lathe bed 6, the gear wheels operating the feed and driven by worm-wheel 19 come to a stand-still, as also does wheel 19. But as long thereafter as shaft 8 drives intermediate shaft 13 the rotation of worm 18 will cause the latter to unscrew itself from worm-wheel 19 in either direction against the compression of spring 20, or 21 respectively. Due to its longitudinal motion worm 18 also operates sliding bolt 27, whose toothed rack 28 turns bolt 29. From Fig. 2 it will be seen that whichever way this rotation may occur, the locking bolt 32 is always moved to the left.

As soon as bolt 32 leaves counter bearing 33, drop casing 19 falls, swinging around driving shaft 8 to a sufficient degree to allow worm 18 to disengage from worm-wheel 19 bringing the traverse to a definite stop, whereupon the compressed spring will return worm 18 to its original position.

What we claim is:

1. An arrangement for the automatic interruption of longitudinal or transverse feeds on machine tools or the like, comprising a lead screw casing supported by a slide, a worm wheel for driving the slide rotatable in said casing, a drive shaft for the slide, a drop-casing housed by said lead screw casing and adapted to swing around the drive shaft, an intermediate shaft carried by the drop-casing and bearing two spiral springs, a worm slidably but non-rotatably mounted on the intermediate shaft between said spiral springs and meshing with the worm wheel, a locking bolt adapted to secure the drop-casing in operative position, and control means for releasing the bolt operated upon axial movement of the worm, the rotation of the worm in engagement with the worm wheel effecting such axial movement of the worm against the compression of one of said springs when the slide engages a fixed stop on the machine.

2. An arrangement for the automatic interruption of longitudinal or transverse feeds on machine tools or the like, comprising a lead screw casing supported by a slide, a worm wheel for driving the slide rotatable in said casing, a drive shaft for the slide, a drop-casing housed by said lead screw casing and adapted to swing around the drive shaft, an intermediate shaft carried by the drop-casing and bearing two spiral springs, a worm slidably but non-rotatably mounted on the intermediate shaft between said spiral springs and meshing with the worm wheel, a locking bolt adapted to secure the drop-casing in operative position, and control means for releasing the bolt operated upon axial movement of the worm, the rotation of the worm in engagement with the worm wheel effecting such axial movement of the worm against the compression of one of said springs when the slide engages a fixed stop on the machine, said control means comprising a carrier engageable by the worm, a toothed rack connected to the carrier, a toothed rotatable bolt for engagement by said rack and adapted upon rotation to release the locking bolt.

3. An arrangement for the automatic interruption of longitudinal or transverse feeds on machine tools or the like, comprising a lead screw casing supported by a slide, a worm wheel for driving the slide rotatable in said casing, a drive shaft for the slide, a drop-casing housed by said lead screw casing and adapted to swing around the drive shaft, an intermediate shaft carried by the drop-casing and bearing two spiral springs, a worm slidably but non-rotatably mounted on the intermediate shaft between said spiral springs and meshing with the worm wheel, a locking bolt adapted to secure the drop-casing in operative position, and control means for releasing the bolt operated upon axial movement of the worm, the rotation of the worm in engagement with the worm wheel effecting such axial movement of the worm against the compression of one of said springs when the slide engages a fixed stop on the machine, said control means comprising a carrier engageable by said worm, a toothed rack connected to the carrier, a toothed rotatable bolt for engagement by said rack and provided with a flat face bearing against a flat face on the locking bolt for shifting the latter upon rotation to release the drop-casing.

4. An arrangement for the automatic interruption of longitudinal or transverse feeds on machine tools and the like, comprising a lead screw casing supported by a slide, a worm wheel for driving the slide rotatable in said casing, a drive shaft for the slide, a drop-casing housed by said lead screw casing and adapted to swing around the drive shaft, an intermediate shaft carried by the drop-casing and bearing two spiral springs, a worm slidably but non-rotatably mounted on the intermediate shaft between said spiral springs and meshing with the worm wheel, the springs being confined by stops to allow but a limited expansion thereof toward the worm, a locking bolt adapted to secure the drop-casing in operative position, and control means for releasing the bolt operated upon axial movement of the worm, the rotation of the worm in engagement with the worm wheel effecting such axial movement of the worm against the compression of one of said springs when the slide engages a fixed stop on the machine.

5. In apparatus of the class described, a slide and drive means therefor including a drive shaft and a worm wheel, a drop-casing adapted to swing around the drive shaft and carrying an intermediate shaft, a worm wheel driven by said drive shaft and mounted upon the intermediate shaft, spring means normally retaining the worm wheel against axial movement, locking means to secure the drop-casing in operative position, and control means for releasing the lockin means upon axial movement of the worm, the rotation of the worm in engagement with the worm wheel effecting such axial movement of the worm against the resistance of said spring means when the slide engages a fixed stop on the machine.

JOHANNES ROLOFF.
HANS HAUTSCH.